(12) United States Patent
Kettenacker et al.

(10) Patent No.: US 8,838,306 B2
(45) Date of Patent: Sep. 16, 2014

(54) METHOD AND DEVICE FOR OPERATING A DRIVE UNIT

(75) Inventors: Guenter Kettenacker, Steinheim (DE); Christian Ruland, Remshalden (DE); Klaus Schwarze, Duderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 832 days.

(21) Appl. No.: 12/452,800

(22) PCT Filed: Jul. 21, 2008

(86) PCT No.: PCT/EP2008/059499
§ 371 (c)(1),
(2), (4) Date: Mar. 31, 2010

(87) PCT Pub. No.: WO2009/013256
PCT Pub. Date: Jan. 29, 2009

(65) Prior Publication Data
US 2010/0198437 A1 Aug. 5, 2010

(30) Foreign Application Priority Data

Jul. 26, 2007 (DE) .......... 10 2007 035 097

(51) Int. Cl.
*B60L 11/00* (2006.01)
*F02D 31/00* (2006.01)
*F02D 41/14* (2006.01)

(52) U.S. Cl.
CPC .......... *F02D 31/001* (2013.01); *F02D 2250/26* (2013.01); *F02D 41/1497* (2013.01)
USPC .................. 701/22; 701/50; 701/93; 701/95; 123/339.19; 123/347; 123/406.23; 477/109; 477/175; 475/219; 180/65.1; 180/65.2; 180/247; 430/30; 60/274; 417/297

(58) Field of Classification Search
CPC ......... B60L 11/00; F02D 41/00; F02D 13/00; F16H 37/02; F16H 61/04; B60K 1/00; B60K 41/02; B60K 31/00; B60K 41/06; F02P 5/00; B60T 8/32; F04B 49/00; G03F 7/00; G05D 1/00; F01N 3/00; F01N 11/00; G06F 19/00
USPC .................. 701/50, 93, 95; 123/339.19, 347, 123/406.23; 477/109, 175; 475/219; 180/65.1, 65.2, 247; 430/30; 60/274; 417/297
See application file for complete search history.

(56) References Cited

U.S. PATENT DOCUMENTS 5,707,317 A * 1/1998 Tabata et al. .................. 477/109
7,594,496 B2 * 9/2009 Frenz et al. .............. 123/406.23
(Continued)

FOREIGN PATENT DOCUMENTS

DE 197 39 564 3/1999
DE 199 26 351 10/2000
(Continued)

*Primary Examiner* — James Trammell
*Assistant Examiner* — Sanjeev Malhotra
(74) *Attorney, Agent, or Firm* — Kenyon & Kenyon LLP

(57) ABSTRACT

In a method and a device for operating a drive unit, a first output variable of the drive unit is restricted; a setpoint value of a second output variable of the drive unit is specified; and an actual value of the second output variable of the drive unit is determined. The setpoint value is compared with the actual value, and if it is determined that the actual value does not exceed the setpoint value, then the first output variable is restricted to a first value. If it is determined that the actual value exceeds the setpoint value, then the first output variable is restricted to a second value smaller than the first value.

12 Claims, 3 Drawing Sheets

(56) References Cited

U.S. PATENT DOCUMENTS

| | | | |
|---|---|---|---|
| 2002/0069009 A1* | 6/2002 | Hellmann et al. | 701/95 |
| 2003/0119620 A1* | 6/2003 | Zwilling et al. | 475/219 |
| 2003/0125859 A1* | 7/2003 | Dix et al. | 701/50 |
| 2004/0048718 A1* | 3/2004 | Tashiro | 477/175 |
| 2004/0118622 A1* | 6/2004 | Morrell et al. | 180/65.1 |
| 2004/0166425 A1* | 8/2004 | Van Der Sande | 430/30 |
| 2005/0173179 A1* | 8/2005 | Amanuma et al. | 180/247 |
| 2006/0032213 A1* | 2/2006 | Woll et al. | 60/274 |
| 2006/0100768 A1* | 5/2006 | Lock et al. | 701/93 |
| 2006/0147317 A1* | 7/2006 | Okamoto et al. | 417/297 |
| 2007/0272207 A1* | 11/2007 | Claudepierre et al. | 123/339.19 |
| 2007/0272455 A1* | 11/2007 | Lang et al. | 180/65.2 |
| 2008/0022969 A1* | 1/2008 | Frenz et al. | 123/347 |

FOREIGN PATENT DOCUMENTS

| | | |
|---|---|---|
| DE | 10 2004 058 | 7/2005 |
| EP | 1 045 122 | 10/2000 |
| JP | 2004-245191 | 9/2004 |

* cited by examiner

METHOD AND DEVICE FOR OPERATING A DRIVE UNIT

BACKGROUND OF THE INVENTION

1. Field of the Invention

The present invention relates to a method and a device for operating a drive unit according to the definition of the species in the independent claims.

2. Description of Related Art

Published German patent document DE 197 39 564 A1 discloses a method and a device for controlling a drive unit of a vehicle, in which a setpoint torque value or a setpoint output value is formed on the basis of the driver input and used to control the drive unit, and a maximally permitted torque or a maximally permitted output is determined, and if it exceeds the maximally permitted value, then the setpoint value is restricted to the maximally permitted value.

BRIEF SUMMARY OF THE INVENTION

In contrast, the method according to the present invention and the device according to the present invention have the advantage that a setpoint value of a second output variable, preferably a rotational speed or a velocity, is specified for the drive unit, an actual value of the second output value of the drive unit is determined, the setpoint value is compared with the actual value, and if it is determined that the actual value does not exceed the setpoint value, then the first output variable is restricted to a first value, and if it is determined that the actual value exceeds the setpoint value, then the first output value is restricted to a second value that is smaller than the first value. In this way a restriction of the first output value of the drive unit as a function of the difference between the actual value of the second output value and the setpoint value of the second output variable is able to be realized. In particular in the case of a drive unit controlled via the rotational speed or the velocity, a restriction of a first output variable of the drive unit which differs from the rotational speed or the velocity is realizable as a function of the difference between the actual rotational speed and the setpoint rotational speed, or as a function of the difference between the actual velocity and the setpoint velocity. A resetting of the control device or a safety-related switch-off of the drive unit when the actual rotational speed exceeds the setpoint rotational speed, or when the actual velocity exceeds the setpoint velocity, is therefore able to be avoided, which increases the availability of the drive unit.

In this context it is advantageous if a maximally permitted value is selected as first value. If it is determined that the actual value of the second output variable does not exceed the setpoint value of the second output value, then this allows the greatest possible value range for the first output variable, so that the operation of the drive unit is in no way restricted.

In addition, it is advantageous if the first output variable is restricted to the second value only if the actual value of the second output variable exceeds the setpoint value of the second output variable by more than a specified offset value. The specified offset value thereby realizes a tolerance range. If a controller is provided which adjusts the actual value of the second output variable to the setpoint value of the second output variable, then this ensures that overshoots of the actual value of the second output variable beyond the setpoint value of the second output variable, or dynamic processes to be corrected at the controller, e.g., the absorption of sudden acceleration decreases in an internal combustion engine, do not yet lead to a restriction of the first output variable to the second value, so that the restriction will not limit the operating range of the controller.

Another advantage results if the second value is selected smaller with increasing exceedance of the setpoint value of the second output variable by the actual value of the second output variable. This makes the second value flexibly adaptable to the difference between the actual value of the second output variable and the setpoint value of the second output variable and thereby postpones a safety-related switch-off of the drive unit or a resetting of the control device for as long as possible, so that the availability of the drive unit is increased even further.

An especially simple implementation of the reduction of the second value with increasing exceedance of the setpoint value of the second output variable by the actual value of the second output variable is able to be realized with the aid of a linear relationship according to a ramp function.

It is also advantageous if a setpoint value for the first output variable is restricted in order to limit the first output variable. It is therefore possible to prevent a rise of the actual value for the first output variable beyond the limit value for the first output variable already at the outset.

An especially advantageous realization results if a controller specifies a setpoint value for the first output variable as a function of the comparison between the setpoint value of the second output variable and the actual value of the second output variable, in order to adjust the actual value of the second output variable to the setpoint value of the second output variable, and if the setpoint value for the first output variable is restricted in order to limit the first output variable. In this way the method according to the present invention is able to be integrated into a control concept for controlling the actual value of the second output variable to the setpoint value of the second output variable in an especially simple manner, so that an excessively high increase of the actual value of the second output variable above the setpoint value of the second output variable is avoided.

Another advantage results if, in the event that it is determined that the actual value of the second output variable exceeds the setpoint value of the second output variable, it is checked whether an actual value of the first output variable exceeds the second value and an error is detected and an error response measure is initiated in this case. This ensures that a faulty rise of the actual value of the first output variable is able to be detected also when the setpoint value for the first output variable is restricted to the second value.

A torque, in particular an indicated torque, or a power output of the drive unit is advantageously selected for the first output variable.

DETAILED DESCRIPTION OF THE INVENTION

Figure 1:
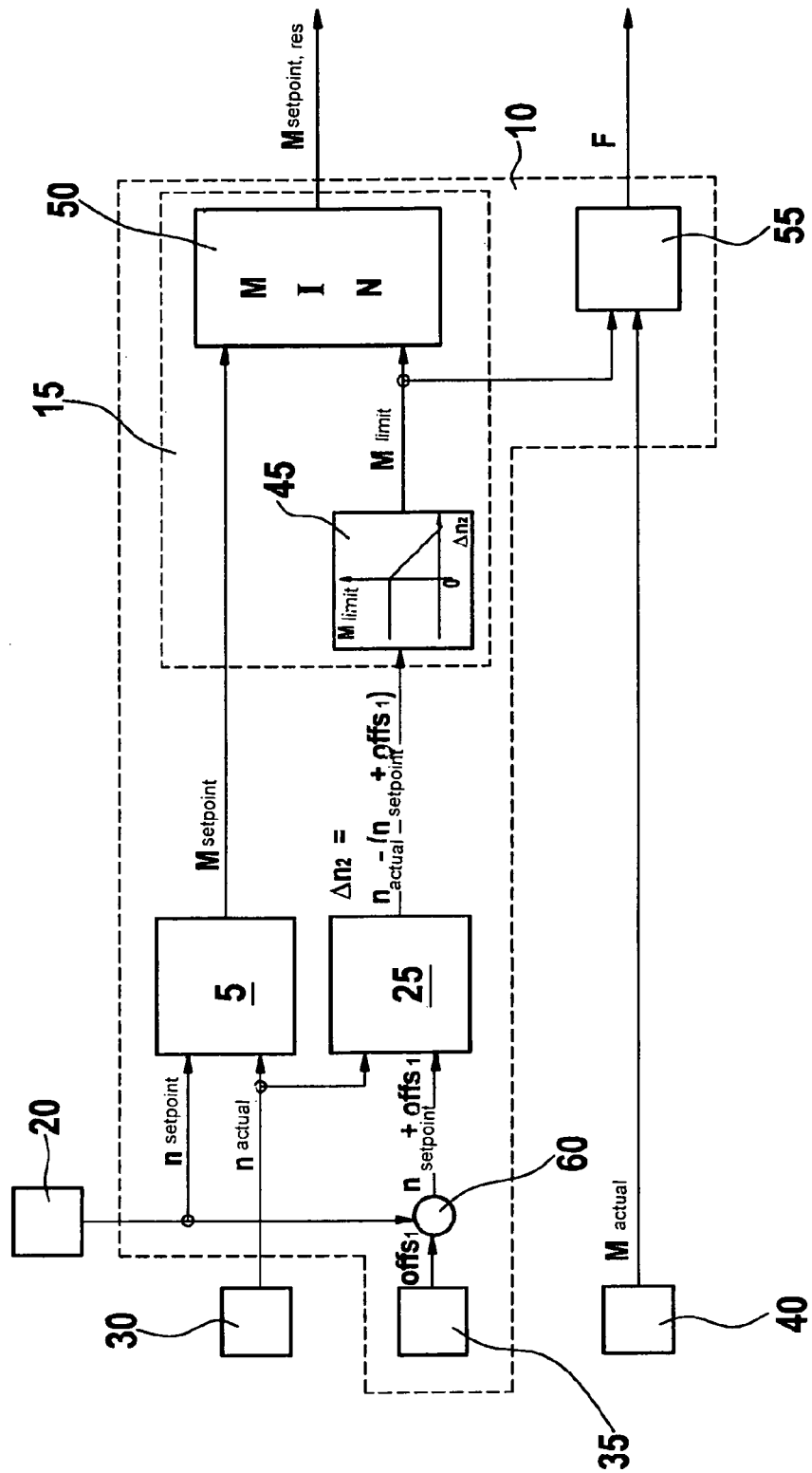
FIG. 1 shows a function diagram of the device according to the present invention.

In FIG. 1, 10 denotes in the form of a function diagram, a device according to the present invention for operating a drive unit. The device may be implemented in a controller, e.g., an engine controller of the drive unit, in the form of software and/or hardware, for example. For instance, the drive unit may include an internal combustion engine, an electromotor or a hybrid drive made up of internal combustion engine and electromotor. The drive unit may drive a motor vehicle, for example. However, it may also drive a generator or construction machinery. The method according to the present invention and the device according to the present invention are especially suitable for operating a drive unit controlled on the basis of the rotational speed or the velocity. If the drive unit includes an internal combustion engine, then the internal combustion engine may be designed as Otto engine or as Diesel engine, for example. If the drive unit of a motor vehicle is involved, for example, then it may be controlled in at least one first operating state, e.g., the idle running operating state, based on the rotational speed, and/or in at least one second operating state based on the velocity. The latter is suitable especially when driving a vehicle as a vehicle speed controller. In the at least one first operating state, a closed-loop control of the rotational speed takes place. In the at least one second operating state, a closed-loop control of the velocity takes place.

A first output variable of the drive unit, e.g., a torque, a power output, or—if an internal combustion engine is involved—also a combustion chamber charge, that differs from the rotational speed and the velocity of the drive unit is restricted to a maximally permitted value. In the case of the torque, this may be the indicated torque, for example. In the following text it is to be assumed by way of example that the drive unit's first output variable to be restricted is a torque. The actual value of the torque or the setpoint value of the torque is able to be restricted. In an exemplary manner it should be assumed in the following that the setpoint value for the torque is restricted.

According to a first exemplary embodiment of the present invention, a drive unit controlled on the basis of the rotational speed is to be examined, and according to a second exemplary embodiment, a drive unit controlled on the basis of the velocity.

In the first exemplary embodiment, a rotational speed of the drive unit is therefore examined as second output variable of the drive unit, and in the second exemplary embodiment, a velocity of a vehicle driven by the drive unit is examined.

Device 10 in FIG. 1 includes a setpoint-generation unit 5, which generates a setpoint value Msetpoint for the torque of the drive unit and supplies it to a minimum-selection element 50 as input variable. Furthermore, an input unit 20 is provided, which specifies a setpoint value for the second output variable of the drive unit, i.e., for rotational speed nsetpoint according to the first exemplary embodiment, and for velocity vsetpoint according to the second exemplary embodiment.

In the following text device 10 is described on the basis of the first exemplary embodiment. The method of functioning for the second exemplary embodiment is analogous; instead of specifying a rotational speed, the driver, for example, specifies a velocity as setpoint velocity vsetpoint by way of a pitman arm, and an actual velocity vactual is determined with the aid of a velocity sensor in the manner known to one skilled in the art.

As shown in FIG. 1, input unit 20 may be situated outside of device 10 according to the present invention, but alternatively also inside device 10.

For a first, or idling, operating state, input unit 20 according to the first specific embodiment of the present invention specifies as setpoint value nsetpoint for the rotational speed an idling speed, suitably applied on a test stand, for example.

Figure 3:
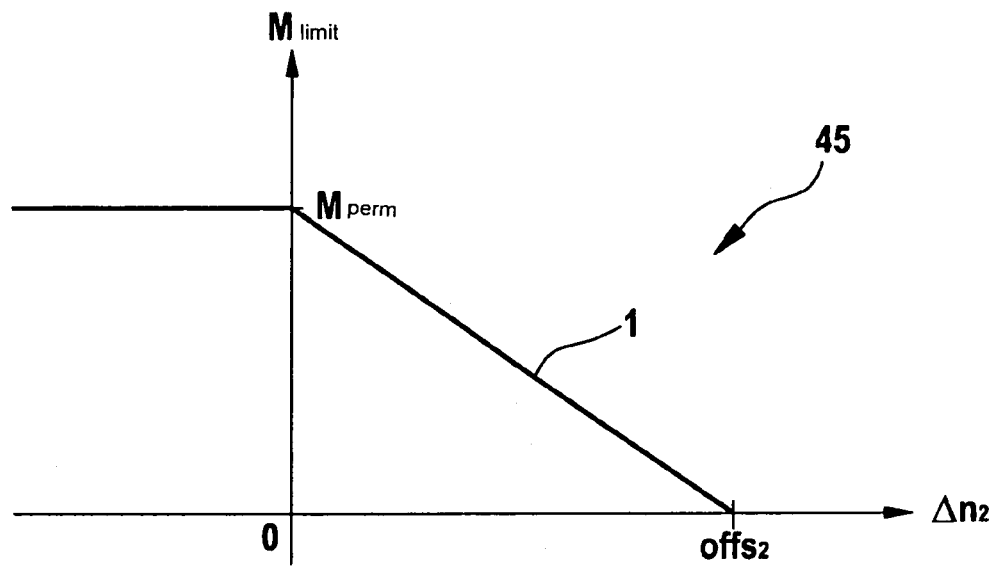
FIG. 3 shows a characteristic curve of a limit value for a torque of the drive unit as a function of a difference in rotational speeds.

For a motor vehicle, for instance, this speed may be 900 revolutions per minute. Device 10 receives an actual value nactual for the rotational speed of the drive unit from an engine-speed sensor 30. Actual value nactual is forwarded to a first comparison unit 25 of device 10. In addition, device 10 includes an offset value memory 35, from which a first offset value offs1 is read out. In an addition element 60, this value is added to setpoint value nsetpoint for the rotational speed. Formed sum nsetpoint+offs1 is also forwarded to first comparison unit 25. First offset value offs1 is suitably applied on a test stand, for example, in such a way that a tolerance range above setpoint value nsetpoint of the rotational speed not yet leading to a restriction of setpoint value Msetpoint of the torque of the drive unit and therefore not restricting the operating range of a closed-loop rotational speed controller, for instance, is realized for actual value nactual of the rotational speed. First comparison unit 25 forms a difference $\Delta n2$ between actual value nactual of the rotational speed and the sum nsetpoint+offs1 at the output of addition element 60, so that $\Delta n2$=nactual−(nsetpoint+offs1). Difference $\Delta n2$ is forwarded to a characteristic curve 45 as input variable. Characteristic curve 45 and minimum-selection element 50 form a restriction unit 15. Characteristic curve 45 is shown in FIG. 3. Characteristic curve 45 maps difference $\Delta n2$ to a limit value Mlimit for setpoint value Msetpoint of the torque of the drive unit. For values $\Delta n2$ that are smaller than or equal to zero, a first limit value results for limit value Mlimit; for values $\Delta n2$ that are greater than zero, a second value, which is smaller than the first value, results for limit value Mlimit. In the example described here, a maximally permitted value Mperm for the torque of the drive unit is selected as first value. In the case of a drive of a motor vehicle, maximally permitted value Mperm may be determined from the accelerator position and the engine speed with the aid of a characteristic map. The second value, as described, is generally selected smaller than the first value, and according to one advantageous specific embodiment, it may be selected smaller with increasing exceedance of the sum from setpoint rotational speed nsetpoint and first offset value offs1 by actual rotational speed nactual. According to FIG. 3, for example, starting from maximally permitted value Mperm for $\Delta n2$ equal to zero and with an increasing rotational speed difference $\Delta n2$, the second value may be linearly reduced down to the zero value according to a ramp function 1. The reduction may also be implemented in a non-linear manner. The reduction of limit value Mlimit given an increasing rotational speed difference $\Delta n2$ greater than zero may be applied in a suitable manner on a test stand, for example, such that the restriction of setpoint value Msetpoint by limit value Mlimit avoids an undesired rise in actual rotational speed nactual above setpoint rotational speed nsetpoint for any rotational speed difference $\Delta n2$ that is greater than zero. However, applying such a characteristic curve is usually more complicated than using the linear ramp function according to FIG. 3. The reason for this is that the linear ramp function is able to be realized with the aid of a mathematical equation and consequently in an especially uncomplicated manner. The equation for linear ramp function 1 reads as follows:

$$M\text{limit}=M\text{perm}-\Delta n2 * M\text{perm}/\text{offs}2 \qquad (1).$$

The relation (1) applies to $0<=\Delta n2<=\text{offs}2$. For $\Delta n2<=\text{zero}$, Mlimit=Mperm, and for $\Delta n2>=\text{offs}2$, Mlimit=0. Depending on the supplied rotational speed difference $\Delta n2$ as input variable, characteristic curve 45 then provides limit value Mlimit as output variable according to the afore-described relations. Limit value Mlimit is then also forwarded to minimum-selection element 50. Value offs2 for rotational speed difference Δn2, at which the second value for limit value Mlimit becomes zero according to linear ramp function 1, for example, may likewise be applied in a suitable manner on a test stand, for instance in such a way that, for one, an undesired rise of actual rotational speed nactual above setpoint rotational speed nsetpoint is avoided by the restriction of the torque of the drive unit, and, for another, limit value Mlimit=0 is reached only at the largest possible rotational speed difference Δn2.

On the other hand, a reduction of the second value down to the zero value starting from maximally permitted value Mperm, may be applied on the test stand in such a way that it results in the largest possible limit value Mlimit for corresponding rotational speed differences Δn2.

From setpoint value Msetpoint and limit value Mlimit, minimum selection element 50 selects the smaller value and outputs it as resulting setpoint value Msetpointres to a further processor for implementation of this resulting setpoint value. Using the example of an internal combustion engine, the implementation may be realized by appropriate setting of the actuating variables of the fuel supply, air supply, and—in the case of an Otto engine—the ignition angle. This further processing may likewise still be carried out in the control device and thus in device 10, or else in a separate control device.

In addition, according to one advantageous further refinement, a determination unit 40 may be provided within or outside of device 10 for the purpose of determining an actual value Mactual of the torque of the drive unit. The determination unit may include a suitable sensor system so that actual value Mactual for the torque is able to be determined; as an alternative, it may represent a torque model which calculates actual value Mactual of the torque of the drive unit from additional performance quantities of the drive unit. Actual value Mactual determined for the torque is forwarded to a second comparison unit 55 of device 10 together with limit value Mlimit. Second comparison unit 55 checks whether actual value Mactual exceeds limit value Mlimit by more than a specified tolerance value. If this is the case, then an error is detected and an error signal F is set at the output of second comparison unit 55; otherwise, error signal F will be reset. If error signal F is set, an entry into an error memory is generated and/or a visual and/or an acoustic reproduction of the error initiated, and/or an error reaction measure is initiated, which, for example, consists of resetting the control device to a specified standard state or, as a final step, switching the drive unit off. It is also possible to provide an error counter which, starting from a specified counter reading, is incremented with each set pulse at the output of second comparison unit 55 and for an error to be detected only when a specified threshold value is detected by the incremented error status. Therefore, the torque monitoring thus realized by second comparison unit 55 is performed not only for negative values of rotational speed difference Δn2, at which actual value Mactual is compared with maximally permitted value Mperm as limit value Mlimit, but also for positive values of rotational speed difference Δn2, at which actual value Mactual of the torque is compared with the second value of limit value Mlimit, reduced starting from the maximally permitted torque Mperm.

The described further processing of error signal F may be performed within device 10 or else also in a different control device.

An example for generating setpoint value Msetpoint of the torque will be described in the following text. According to an advantageous further development of the present invention, a controller 5 is provided inside device 10, to which setpoint rotational speed nsetpoint is supplied by input unit 20, for one, and actual rotational speed nactual by engine speed sensor 30 for another. Controller 5 forms system deviation Δn1=nactual−nsetpoint as first rotational speed difference. Controller 5 then generates setpoint value Msetpoint for the torque of the drive unit as a function of first rotational speed difference Δn1, in such a way that system deviation Δn1 becomes minimal and actual rotational speed nactual is thereby adjusted to setpoint rotational speed nsetpoint. Controller 5 may encompass an integral-action component and/or a proportional component, and/or a differential component.

First offset value offs1 may assume the zero value as smallest value. In this case, no tolerance would be reached for the exceedance of setpoint rotational speed nsetpoint by actual rotational speed nactual.

Because of characteristic curve 45, setpoint value Msetpoint for the torque is restricted in minimum-selection element 50 to the second value smaller than the maximally permitted value only if actual rotational speed nactual exceeds setpoint rotational speed nsetpoint by more than first offset value offs1; as described, the latter may also be zero in the smallest case.

In the following text, a numerical example is provided for linear ramp function 1 according to equation (1):

For example, for maximally permitted torque Mperm in a working point of the drive unit defined by the accelerator pedal position and actual rotational speed nactual, a value of 1,000 Nm may be specified. For second offset value offs2, a value of 300 rotations per minute may be specified, for example. Thus, linear ramp function 1 according to equation (1) is clearly defined. To determine rotational speed difference Δn2, a value of 100 rotations per minute, for example, may be specified as first offset value offs1. For setpoint rotational speed nsetpoint, a value of 1,500 rotations per minute may be specified, for example. At an actual rotational speed nactual of 1,800 rotations per minute, for instance, this will then result in a limit value Mlimit of 333.3 Nm.

A faulty rise in actual value Mactual of the torque above limit value Mlimit, or a faulty rise of actual rotational speed nactual above setpoint rotational speed nsetpoint may then be caused for instance by an error in the controller, e.g., by a false data input of the control parameters, or generally by an error in a processor or microcontroller of device 10 or the engine controller, which is used to determine the actuating variables for implementing setpoint value Msetpoint for the torque.

Figure 2:
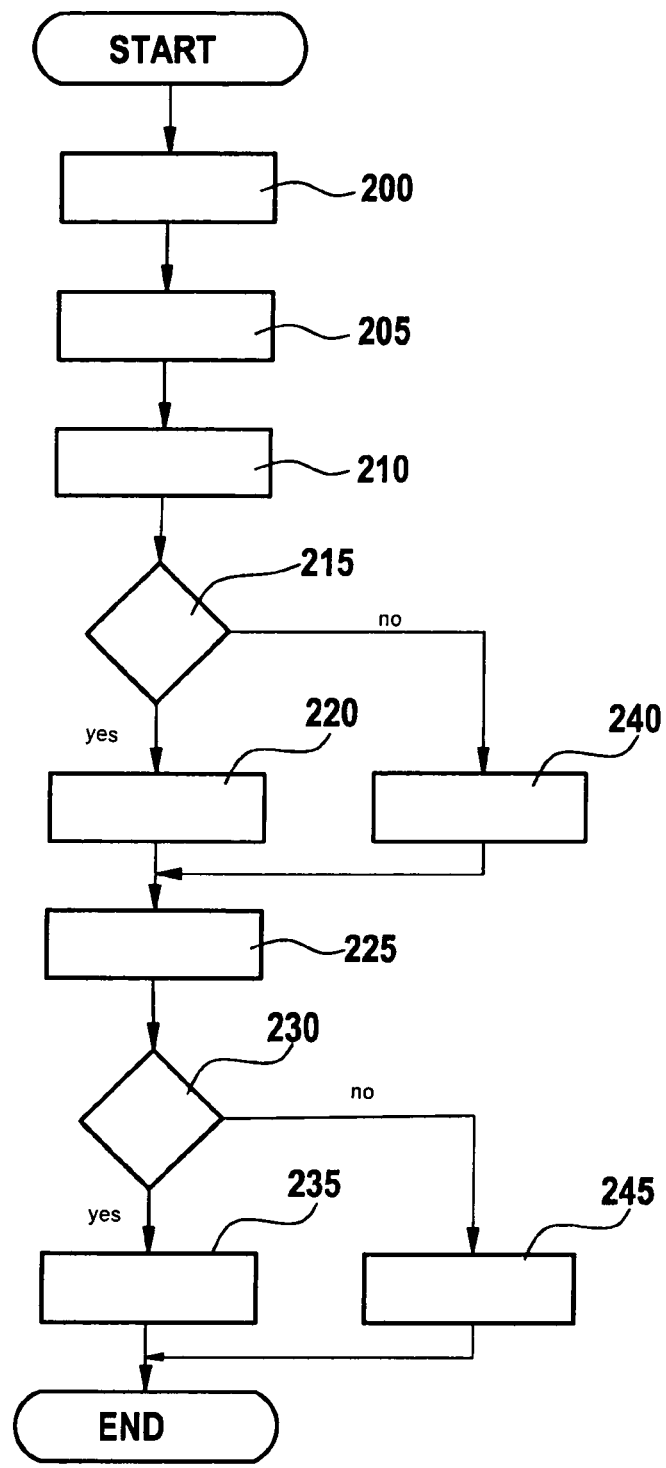
FIG. 2 shows an exemplary sequence of the method according to the present invention.

FIG. 2 shows a flow chart of an exemplary sequence of the method according to the present invention.

Following the start of the program, input unit 20 determines setpoint rotational speed nsetpoint in a program point 200, and engine speed sensor 30 records actual rotational speed nactual. In addition, determination unit 40 determines actual value Mactual for the torque. Afterward, branching to a program point 205 takes place.

In program point 205, controller 5 determines setpoint value Msetpoint for the torque as a function of setpoint rotational speed nsetpoint and actual rotational speed nactual, or first rotational speed difference Δn1 derived therefrom in the manner described. Afterward, branching to a program point 210 takes place.

In program point 210, addition element 60 generates the sum from setpoint rotational speed nsetpoint and first offset value offs1. Afterward, branching to a program point 215 takes place.

In program point 215, first comparison unit 25 checks whether actual rotational speed nactual is greater than the sum from setpoint rotational speed nsetpoint and first offset value offs1. If this is the case, the method branches to a program point 220; otherwise, the method branches to program point 240.

In program point 220, characteristic curve 45 forms limit value Mlimit in accordance with linear ramp function 1 according to equation (1) for 0<$\Delta$n2<offs2. Furthermore, characteristic curve 45 forms limit value Mlimit=0 for $\Delta$n2>=offs2 in program point 220.

Maximally permitted value Mperm is greater than zero. For $\Delta$n2 greater than or equal to offs2, the second value for limit value Mlimit is equal to zero and thus also smaller than maximally permitted value Mperm.

Afterward, branching to a program point 225 takes place.

In program point 240, characteristic curve 45 forms limit value Mlimit equal to maximally permitted value Mperm. The program subsequently branches to program point 225.

In program point 225, minimum-selection element 50 generates resulting setpoint value Msetpointres for the torque as the smaller one of the two values Msetpoint and Mlimit. Then, branching to a program point 230 takes place.

In program point 230, second comparison unit 55 checks whether actual value Mactual for the torque is greater than limit value Mlimit plus a specified tolerance value, if applicable, the latter being able to be applied on a test stand, for example. If this is the case, i.e., if actual value Mactual is greater than the sum from limit value Mlimit and the tolerance value, then branching to a program point 235 takes place; otherwise branching to a program point 245 occurs.

In the lowest case, the tolerance value may be selected equal to zero; in this case no tolerance will then be taken into account in the torque comparison in first comparison unit 55.

In program point 235, error signal F is set, whereupon the program is left. In program point 245, error signal F is reset. Then the program is left.

As already described, the present invention according to the first exemplary embodiment may be realized in analogous manner for the second exemplary embodiment, a setpoint velocity vsetpoint of the vehicle being used instead of setpoint rotational speed nsetpoint of the drive unit, and an actual velocity vactual of the vehicle being used instead of actual rotational speed nactual. In that case, controller 5 performs a closed-loop control of the driving velocity according to a first velocity difference $\Delta$v1 between actual velocity vactual and setpoint velocity vsetpoint.

In the following text, the characteristic curve of the limit value for the torque of the drive unit as a function of a second velocity difference $\Delta$v2=vactual−(vsetpoint+voffs1) will be explained for the second exemplary embodiment based on FIG. 4 and a numerical example. Analogously to first offset value offs1 for the rotational speed, voffs1 is the first offset value for the velocity. Characteristic curve 46 for generating limit value Mlimit according to FIG. 4 as a function of second velocity difference $\Delta$v2 reads as follows:

$$M\text{limit}=M\text{perm for }\Delta v2<0 \quad (2)$$

$$M\text{limit}=M\text{perm}-\Delta v2*M\text{perm}/v\text{offs2 for } 0<=\Delta v2<=v\text{offs2}$$

$$M\text{limit}=0 \text{ for } \Delta v2>v\text{offs2}$$

Analogously to second offset value offs2 for the rotational speed, voffs2 is the second offset value for the velocity. Equation (2) represents linear ramp function 2 according to FIG. 4.

Figure 4:
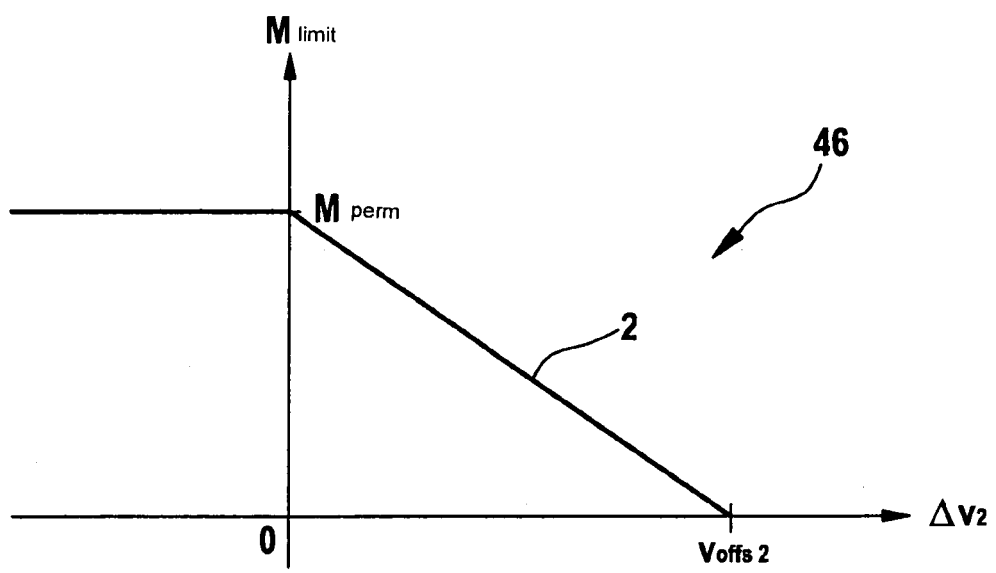
FIG. 4 shows a characteristic curve of a limit value for a torque of the drive unit as a function of a difference in velocity.

The method of functioning of this torque restriction according to FIG. 4 is described in the following text using a numerical example.

Up to the first offset value for the velocity, e.g., voffs1=2 km/h above setpoint velocity vsetpoint, maximally permitted value Mperm for the torque is allowed as actuating variable for the closed-loop control of the velocity, because no information whatsoever is available regarding the loading at this velocity and a certain reserve for precontrols and the non-manipulated work of the controller is required.

Up to second offset value voffs2 of second velocity difference $\Delta$v2 of voffs2=2 km/h, for example, limit value Mlimit is then ramped down in linear fashion from the maximally permitted value at $\Delta$v2=0, to 0 Nm at $\Delta$v2=2 km/h, and the controller restricted to this. In other words, at Mperm=1,000 Nm, for example, vsetpoint=60 km/h, vactual=63 km/h, voffs1=2 km/h and voffs2=2 km/h, the associated limit value according to characteristic curve 46 [sic; 45] then is Mlimit=500 Nm.

What is claimed is:

1. A method for operating a drive unit of a motor vehicle, comprising:

using a controller, adjusting an actual value of a first output variable of the drive unit toward a setpoint value for the first output variable; and restricting the actual value of the first output variable of the drive unit as a function of a specified comparison process, wherein the specified comparison process includes:

specifying a setpoint value for a second output variable of the drive unit, wherein the second output variable includes one of a rotational speed or a velocity;

using the controller, adjusting an actual value of the second output variable towards the setpoint value for the second output variable;

determining the actual value of the second output variable of the drive unit;

comparing the setpoint value for the second output variable with the actual value of the second output variable; and selecting a limit value from which the actual value of the first output variable is permitted to deviate in accordance with the setpoint value for the first output variable, but which the actual value of the first output variable is not permitted to exceed, the selecting being based on the comparing of the setpoint value for the second output variable with the actual value of the second output variable, such that the limit value is selected to be greater when the actual value of the second output variable does not exceed the setpoint value than when the actual value of the second output variable exceeds the setpoint value.

2. The method as recited in claim 1, further comprising:

restricting the first output variable by setting the setpoint value for the first output variable equal to the lower of a calculated setpoint value for the first output variable and the limit value.

3. The method as recited in claim 1, wherein the selection of the limit value is performed such that the limit value is increasingly smaller with increasing exceedance of the setpoint value by the actual value of the second output variable.

4. The method as recited in claim 1, wherein the selection of the limit value is performed such that the limit value is reduced linearly according to a ramp function with increasing exceedance of the setpoint value by the actual value of the second output variable.

5. A method for operating a drive unit of a motor vehicle, the method comprising:

using a controller, adjusting an actual value of a first output variable of the drive unit toward a setpoint value for the first output variable; and restricting the actual value of the first output variable of the drive unit as a function of a specified comparison process, wherein the specified comparison process includes:

specifying a setpoint value for a second output variable of the drive unit, wherein the second output variable includes one of a rotational speed or a velocity;

using the controller, adjusting an actual value of the second output variable towards the setpoint value for the second output variable;

determining the actual value of the second output variable of the drive unit;

comparing the setpoint value for the second output variable with the actual value of the second output variable; and selecting a limit value from which the actual value of the first output variable is permitted to deviate from in accordance with the setpoint value for the first output variable, but which the actual value of the first output variable is not permitted to exceed, the selecting being based on the comparing of the setpoint value for the second output variable with the actual value of the second output variable, such that the limit value is selected to be smaller when the actual value of the second output variable exceeds the setpoint value by more than a specified offset value than when the actual value of the second output variable does not exceed the setpoint value by more than the specified offset value.

6. The method as recited in claim 5, wherein the selection of the limit value is performed such that the limit value is increasingly smaller with increasing exceedance, by more than the specified offset value, of the setpoint value by the actual value of the second output variable.

7. The method as recited in claim 5, wherein the selection of the limit value is performed such that the limit value is reduced linearly according to a ramp function with increasing exceedance, by more than the specified offset value, of the setpoint value by the actual value of the second output variable.

8. The method as recited in claim 5, wherein the limit value is applied to the setpoint value for the first output variable to prevent the actual value of the first output variable from exceeding the limit value.

9. The method as recited in claim 8, wherein the setpoint value for the first output variable is specified by a controller as a function of the comparing of the setpoint value for the second output variable with the actual value of the second output variable in order to adjust the actual value of the second output variable to the setpoint value of the second output variable.

10. The method as recited in claim 5, further comprising:
when the actual value of the second output variable exceeds the setpoint value of the second output variable:
checking whether the actual value for the first output variable exceeds the limit value;
determining that an error exists when the actual value for the first output variable exceeds the limit value; and
initiating an error response measure in response to determining that the error exists.

11. The method as recited in claim 5, wherein one of a torque or a power output of the drive unit is selected as the first output variable.

12. A control device for operating a drive unit of a motor vehicle, comprising:
a restriction unit configured to restrict a first output variable of the drive unit wherein the control device is configured to adjust an actual value of the first output variable toward a setpoint value of the first output variable; and
a comparison unit configured to compare a specified setpoint value of a second output variable of the drive unit with a determined actual value of the second output variable, wherein the second output variable includes one of a rotational speed or a velocity, and wherein the control device is configured to adjust the actual value of the second output variable toward the setpoint value of the second output variable;
wherein the restriction unit is configured to select a limit value which the actual value of the first output variable is permitted to deviate from in accordance with the setpoint value of the first output variable, but is not permitted to exceed, the selecting of the limit value being based on the comparison of the setpoint value of the second output variable with the actual value of the second output variable, such that the limit value is selected to be greater when the actual value of the second output variable does not exceed the setpoint value than when the actual value of the second output variable exceeds the setpoint value.

* * * * *